United States Patent Office 3,124,479
Patented Mar. 10, 1964

3,124,479
COPPER-NICKEL ALLOY WELDING ELECTRODE
Charles E. Witherell, Bound Brook, N.J., assignor to The International Nickel Company, Inc., New York, N.Y., a corporation of Delaware
No Drawing. Filed July 25, 1961, Ser. No. 126,504
6 Claims. (Cl. 117—205)

The present invention relates to a copper-nickel alloy welding electrode, and, more particularly, to a copper-nickel alloy welding electrode having a special flux coating, which electrode deposits 70-30 type copper-nickel alloy weld metal.

It is well known that much of the copper-nickel alloy welding done today is for applications where weld quality is of extreme importance and/or where, as in vertical welding, overhead welding, etc., it is not feasible to shop-weld employing automatically and/or semi-automatically controlled welding machines, and, it is therefore necessary to employ on-the-job welding techniques. For example, copper-nickel alloys are widely used in marine or naval service because of their good resistance to salt-water corrosion. On board ship, of course, most welds cannot be positioned for the welder. Consequently, it is not uncommon for welders to use mirrors in order to be able to see the area to be welded. Oftentimes, this area is but a few inches from a bulkhead or other immovable obstruction. Obviously, under such severe circumstances, one of the problems facing the art is to produce a copper-nickel welding electrode which has the characteristics of ease of operability. The solution to the problem has, in the past, conflicted with the solution to the problem of producing a copper-nickel alloy welding electrode capable of producing high quality welds. Thus, the art has been confronted, in the past, with the dilemma of employing a copper-nickel alloy welding electrode having either ease of operability or weld quality, but not both.

The aforementioned dilemma is exemplified by the history of copper-nickel welding art. For example, the preferred prior art welding electrode for welding 70-30 type copper-nickel alloys has not been the one offering the best weld metal properties or the most sound deposit but the one that is easiest to use on the job. The slag produced by this prior art electrode has a tendency to short circuit the arc whenever it flows beneath the electrode tip or around the area to the forward side of the weld puddle during welding. This characteristic causes some interference with the free manipulation of the electrode, particularly in a tight V-groove fillet. In vertical position welding, the slag interference worsens and causes frequent "shorting-out" of the arc. In overhead welding, the flux shield, which in flat position welding extends slightly forward of the core wire at the arc end, tends to melt away leaving a bared core wire at the electrode tip. Thus, the arc does not have the protection in the overhead position that it does in the flat position with the result that welds made in the overhead position are even more porous than welds made in the flat position. In addition, arc starting is often a problem with this prior art electrode in the overhead position. Furthermore, the weld deposits produced with this electrode are quite porous and do not meet the recently tightened weld quality standards for certain critical applications.

In spite of the foregoing shortcomings of the aforementioned prior art electrode, it was nevertheless preferred over other prior art electrodes since the latter electrodes were almost impossible to manipulate in any position other than the flat position. These latter electrodes, while often producing sounder welds than the former in the flat position, were particularly unsuitable since it was frequently necessary to grind defective welds (caused by slag inclusion) and then reweld. Furthermore, grinding and rewelding are necessarily expensive operations and are, therefore, altogether undesirable.

Although many attempts were made to overcome the foregoing difficulties and other disadvantages, none, as far as I am aware, was entirely successful when carried into practice commercially on an industrial scale.

It has now been discovered that sound, non-porous, crack-free copper-nickel welds and overlays can be produced in all positions including the overhead and vertical positions on copper-containing alloys by employing a specially coated copper-nickel alloy welding electrode.

It is an object of the present invention to provide an improved coated welding electrode which has a copper-nickel alloy core wire and has a special flux coating containing, in novel combination, special proportions of ingredients, and which electrode is particularly adapted for use in all positions.

Another object of the present invention is to provide a process for making a welding electrode which is particularly adapted for welding and overlaying copper-containing metals and alloys.

Still another object of the invention contemplates an improvement in the method of welding or overlaying copper-nickel alloys with welds which are free of porosity and cracking.

It is a further object of the invention to provide a copper-nickel alloy welding electrode which has a durable coating.

It is also an object of the present invention to provide a coated nickel-containing welding electrode which has a highly effective arc-shield, a stable arc and which produces a readily removable friable slag.

Other objects and advantages will become apparent from the following description:

Broadly stated, the present invention contemplates an all-position, coated welding electrode having a 70-30 type copper-nickel alloy core and a flux-coating. In general, the core contains, by weight, about 25% to about 35% nickel, up to about 1% iron, less than about 0.15% carbon, up to about 1% silicon, up to about 3% manganese, up to about 1% titanium, with the balance being essentially copper. The flux coating of the copper-nickel alloy welding electrode is a special flux containing controlled amounts of manganese carbonate and titanium dioxide, with each constituent of the flux being in a special proportion with the other constituents thereof so that, together with the copper-nickel alloy core wire, a coated arc-welding electrode is obtained which provides welds or overlays containing about 25% to about 35% nickel, up to about 1% iron, up to about 0.15% carbon, up to about 0.75% silicon, up to about 3% manganese, up to about 0.5% titanium, with the balance essentially copper. In addition, the welds and overlays produced through the use of the electrode provided in accordance with the present invention are free of cracks and porosity, regardless of the welding position used, even when relatively large sections are involved and conditions of severe restraint are present.

The dry flux of the coating contemplated by the present invention contains the following ingredients in the amounts set forth (in parts by weight of the dry flux):

TABLE I

| Ingredients | Range |
| --- | --- |
| Manganese Carbonate | 5 to 70 |
| Alkaline Earth Metal Carbonate, e.g., Calcium Carbonate, Barium Carbonate, Strontium Carbonate and combinations thereof | up to 40 |
| Manganese Carbonate plus Alkaline Earth Metal Carbonate | 15 to 70 |
| Titanium Dioxide | 10 to 35 |
| Cryolite | 5 to 40 |

From Table I, it is to be noted that up to about 40 parts of alkaline earth metal carbonate may be substituted part for part for some, but not all, of the manganese carbonate in the flux. Thus, the flux must always contain at least about 5 parts of manganese carbonate and no more than about 70 parts in total of alkaline earth metal carbonate plus manganese carbonate. For example, when the flux contains about 10 parts to about 40 parts of alkaline earth metal carbonate it also must contain about 5 parts to about 30 parts of manganese carbonate in addition to about 10 parts to about 35 parts of titanium dioxide and about 5 parts to about 40 parts of cryolite. Furthermore, when no alkaline earth metal carbonate is present in the flux, the manganese carbonate must be present in the range of about 15 parts to about 70 parts.

It is essential that all of the foregoing ingredients of the dry flux composition be present in the amounts specified for at least three reasons. Firstly, when the flux is decomposed, the necessary gaseous products are formed which protect the arc and the superheated puddle of molten metal from the detrimental effects of the atmosphere. Secondly, the flux forms a cover of slag that aids in supporting the molten puddle of weld metal in vertical and overhead welding and that protects the hot weld metal from the atmosphere as it cools. Thirdly, the flux provides a means whereby deoxidizing and/or alloying additions are introduced to the weld fusion. The cryolite, for example, should be present in combination with the remainder of the flux in amounts as set forth in Table I as it has been found to be an effective fluxing agent and an aid in dissolving oxides and in maintaining a low level of non-metallic inclusions in the weld metal. Cryolite helps eliminate oxides, promotes weld soundness and is very helpful in imparting the proper viscosity and surface tension to the slag to control the molten weld metal in the vertical and overhead positions. On the other hand, if more than 40 parts of cryolite, by weight, are present in the flux the operability of the electrode is affected adversely since it causes a melting back of the cone-shaped shield of flux coating formed at the tip of the electrode which, of course, exposes the core wire to the deleterious effects of the ambient atmosphere. This condition has at least a two-fold effect. Firstly, the melting coating has a tendency to agglomerate in small balls along the sides of the electrode near the arc and obstructs the welder's vision as well as hindering manipulation in a tight groove, fillet or V. Secondly, the loss of the shield of flux at the tip of the electrode exposes the core wire to the atmosphere, promotes unsoundness in the weld and gives the electrode a tendency to freeze to the workpiece if the arc length is shortened excessively. If cryolite, on the other hand, is present below the amounts specified, the slag produced will lack the viscous properties necessary for overhead and/or vertical welding.

The titanium dioxide should be present in combination with the remainder of the flux in amounts from about 10 parts to about 35 parts since it aids in the production of a stable arc and a spray-type transfer of weld metal across the arc. It also aids in the production of a slag that is easily removed. Too little titanium dioxide produces a powdery slag which is difficult to remove. Too much results in an objectionable level of spatter and may cause weld cracking.

The total carbonates in the flux, i.e., manganese carbonate and alkaline earth metal carbonate, must be in the range of about 15 parts to about 70 parts by weight to insure optimum operability and slag behavior of the electrode. More than 70 parts of the total carbonate causes the slag to become powdery and crumbly and difficult to remove particularly when the contour of the weld bead is irregular. When less than 15 parts of the total carbonate, including at least 5 parts of manganese carbonate, is present the slag is inadequate, protection of the arc is deficient and the arc becomes unstable. The manganese carbonate in the minimum amounts specified in Table I is essential. The manganese, only as the carbonate, affords, in combination with the remainder of the flux, good slag characteristics and helps produce an easily removed friable and dense slag. This mineral, in conjunction with the other flux constituents, provides the proper slag melting point for its easy removal, and exactly the right viscosity and surface tension to enable welds to be easily made in the vertical and overhead positions. Its products of decomposition also provide an effective arc shield. Too much or too little manganese carbonate in the flux adversely affects arc operability and slag characteristics.

The alkaline earth metal carbonate, advantageously calcium carbonate, where substituted for some of the manganese carbonate should be present in combination with the remainder of the flux within the range specified in Table I and, advantageously, in amounts from about 10 parts to about 40 parts by weight of the dry flux, in order to form on decomposition a gaseous protective envelope of a relatively non-reactive gas surrounding the arc to exclude the ambient atmosphere. It also is a good slag former and arc stabilizer.

The electrode coating having this combination of ingredients affords optimum operability and, in conjunction with the core wire which comprises the bulk of the weld deposit, provides the desired high level of weld quality. However, the characteristics of the flux-slag system provided by the coated electrode of the present invention are not the result of one or two ingredients alone but are the product of a balanced combination of the ingredients as itemized in Table I. In addition, the aforementioned ingredients in combination provide a durable coating that withstands handling and shipping without breakage. The coating of the present invention also provides adequate dielectric strength to insulate the core from breakdown through contact of the exterior of the coated rod to a grounded workpiece.

Optionally, up to about 6 parts of silicon, advantageously as a nickel-silicon alloy containing, by weight, from about 20% to about 40% silicon, e.g., 30%, with the balance essentially nickel, and up to about 4 parts of titanium, advantageously as a nickel-titanium alloy containing, by weight, from about 10% to about 40% titanium, e.g., 25%, with the balance essentially nickel, can be added to the dry flux. In either case, ferro-alloys could be substituted for nickel with regard to the silicon and titanium additions. These nickel- and ferro-alloys, when present in the flux, serve primarily as deoxidants. The silicon, in addition to its deoxidation characteristics, helps to strengthen the weld deposit and provide welds having tensile strength levels in excess of 50,000 pounds per square inch (p.s.i.) which are required by the codes for certain applications, e.g., heat exchangers, condensers, pressure lines, etc. Furthermore, silicon somewhat improves the arc and slag behavior of the electrode. The silicon, particularly in the advantageous ranges hereinafter set forth in Table III, infra, strengthens the copper-rich phase in the weld metal and thereby is beneficial in decreasing weld metal cracking. However, excess amounts of silicon, i.e., more than 6 parts, are embrittling and cause weld cracking. The principal advantage of titanium in the flux is to eliminate porosity. Excessive quantities, i.e., more than 4 parts by weight of the dry flux will adversely alter the recovery of other alloying ingredients, e.g., silicon, and may cause embrittlement of the deposit if exposed to high temperature for prolonged periods of time.

In addition, extrudability aids such as bentonite or similar colloidal clays, and humectants such as alginates, gums, glycolates, sodium carboxymethyl cellulose, etc., can be added to the dry flux in amounts totaling up to about 5 parts by weight of the flux to improve the extrudability of the flux.

The core of the electrode contemplated by this invention is, as was mentioned hereinbefore, a 70-30 type copper-nickel alloy core wire containing, by weight, about 25% to about 35% nickel, up to about 1% iron, up to about 0.15% carbon, up to about 1% silicon, up to about 1% titanium with the balance being essentially copper. Advantageously, the core wire has the composition shown in Table II in weight percent of the core.

TABLE II

| Element | Advantageous Range | Example |
|---|---|---|
| Copper | Balance | Balance (68) |
| Nickel | 29 to 32 | 30 |
| Iron | 0.3 to 0.8 | 0.6 |
| Carbon | less than 0.1 | 0.02 |
| Silicon | up to 0.5 | 0.1 |
| Manganese | up to 1.5 | 0.8 |
| Titanium | up to 0.5 | 0.25 |

In carrying the invention into practice, it is advantageous to use the particular ingredients of the dry flux in the amounts set forth in the following Table III (in parts by weight of the dry flux):

TABLE III

| Preferred Ingredients | Range | Example |
|---|---|---|
| Calcium Carbonate | 15 to 30 | 23 |
| Manganese Carbonate | 15 to 25 | 21 |
| Titanium Dioxide | 15 to 30 | 22 |
| Cryolite | 10 to 30 | 21 |
| Silicon [1] | ½ to 2 | 1 |
| Titanium [2] | ½ to 2 | 1 |
| Bentonite | 2 to 5 | 3 |

[1] Preferably as a nickel-silicon alloy, e.g., one containing about 30% silicon.
[2] Preferably as a nickel-titanium alloy, e.g., one containing about 25% titanium.

The ingredients used in making the flux are powdered ingredients. In general, the mixed ingredients usually have a particle size of between about 50 microns and about 300 microns.

A water dispersible binder ordinarily is employed with the flux coating to provide a durable and hard coating on the copper-nickel alloy core after drying and baking. The binder advantageously is of the silicate type as it produces a durable coating that does not require a rebake prior to use, which may be an aqueous solution of sodium silicate and/or potassium silicate. The following Table IV gives the amounts (in parts by weight of the dry flux) of ingredients which can be used for the binder. It is to be noted, however, that a silicate solution of a different specific gravity than shown herein also can be used.

TABLE IV

| Ingredient | Range | Example |
|---|---|---|
| Sodium Silicate Solution (47° Baumé) | 10 to 20 | 15 |
| Water | As needed for extrudable consistency. | 2 |

The flux coating can be applied to the core wire in any suitable manner, e.g., by an extrusion process, and dried on the wire surface by suitable drying and/or baking. This results in a hard adherent coating of high mechanical strength relatively resistant to mechanical damage under normal handling conditions. A satisfactory drying or baking treatment of the flux and binder mixture comprises a normal continuous oven drying treatment followed by a baking treatment comprising gradually raising the temperature to about 600° F. and holding at that level for about two hours.

Examples of typical electrode dimensions (core diameter plus flux thicknesses) are given in Table V. All dimensions therein contained are in inches.

TABLE V

| Core Diameter | Electrode Diameter, Range | Electrode Diameter, Example |
|---|---|---|
| 3/32 | 0.12-0.15 | 0.13 |
| 1/8 | 0.17-0.2 | 0.18 |
| 5/32 | 0.21-0.23 | 0.22 |
| 3/16 | 0.25-0.27 | 0.26 |

However, it is permissible, as will be apparent to those skilled in the art, to vary considerably the core diameter-flux thickness relationships from those properties given in the preceding table. However, the flux coating usually constitutes from about 25% to about 35% by weight of the electrode.

The compositions of the deposits and/or overlays, of course, will vary somewhat depending upon the exact composition of the electrode employed, i.e., the composition of the core wire and the composition of the flux. Furthermore, the combination of any of the flux compositions of Tables I and III with any of the compositions of the core wire in the broad range or in the advantageous ranges and examples of Table II are within the scope of this invention. In addition, the composition of the base metal being welded will affect the compositions of the deposits and/or overlays. However, all weld deposits produced using the electrodes of this invention will have compositions in the ranges shown in Table VI in percent by weight.

TABLE VI

| Element | Broad Range | Advantageous Range | Example |
|---|---|---|---|
| Copper | Balance | Balance | 66 |
| Nickel | 25 to 35 | 29 to 32 | 31.2 |
| Iron | up to 1 | 0.3 to 0.8 | 0.6 |
| Carbon | up to 0.1 | less than 0.05 | 0.03 |
| Silicon | up to 0.6 | up to 0.5 | 0.3 |
| Manganese | up to 2.5 | up to 2 | 1.7 |
| Titanium | up to 0.5 | up to 0.2 | 0.04 |

As is shown in Table VI, it is advantageous to have a small amount of iron present in the copper-nickel alloy weld metal since iron in those amounts imparts optimum corrosion resistance to the copper-nickel alloy. Ordinarily, when the iron is in the core wire, the transfer of it across the welding arc is almost 100% as is illustrated by a comparison of Tables II and VI with regard to the iron content.

For the purpose of giving those skilled in the art a better understanding of the invention and a better appreciation of the advantages of the invention, the following illustrative examples are given:

*Example I*

An electrode was prepared from a core wire containing about 30% nickel, about 0.6% iron, about 0.1% silicon, about 0.8% manganese, about 0.25% titanium, less than about 0.02% carbon, and about 68% copper. The core wire was coated with the flux composition set forth under "Example" in Table III, by extrusion, using a binder consisting of about 15 parts by weight of the flux of sodium silicate solution (47° Baumé) and about 2 parts by weight of water. The electrode thus constituted was oven dried and subsequently baked at about 600° F. for about 2 hours.

*Example II*

A single-V-groove butt weld was made in the flat position in ⅜ inch thick 70–30 copper-nickel alloy plate conforming in composition and mechanical properties to the MIL–C–15726C (ships) specification, i.e., it is an alloy containing about 29% nickel, about 0.7% iron, about 0.2% zinc, about 0.7% manganese and about 68.7% copper. The plates were ten inches long by five inches wide, and were welded with an electrode having the composition set forth in Example I and having the diameter as shown in Table V, supra, for a ³⁄₃₂ inch core diameter. The joint had a ³⁄₃₂ inch root spacing positioned over a grooved copper backing bar. The lip on the root edge of the joint had a ¹⁄₁₆ inch wide land, and the V-groove was 80° when butted together. The joint was restrained from warping during welding by clamping securely to a 6" thick steel platen. Penetration of the root bead was complete. No back chipping was done and no sealing pass was deposited on the root side. The purpose in not back-chipping and seal-welding the root side was to provide a reliable indication of the ductility of the root side of the weld for the hereinafter shown bend tests. This would have been masked by depositing a sealing pass on the root side.

The joint was then X-rayed using a 2% sensitivity penetrameter as defined in the Welding Handbook, 1957, section 1–8.39, published by the American Welding Society, and no porosity or defects were observed. After X-raying, the weldment was cross-sectioned to provide transverse tensile and transverse bend test specimens. One tensile, two face-bend, and two root-bend specimens were obtained.

The tensile specimen was tested in full-section thickness with a reduced test section width of 1 inch. The weld reinforcement at the top of the joint and the root penetration were machined off flush with the surface of the plate. This was done for both tensile and bend specimens before testing. The tensile specimen had an ultimate tensile strength of 58,600 p.s.i., a 0.2% offset yield strength of 28,700 p.s.i., and an elongation of 41% in a one inch gage length across the weld.

The transverse bend specimens were tested by bending 180° over a steel pin having a radius equal to two times the plate thickness, i.e., 0.75" radius pin. The specimens were bent so that the root side was in tension in two specimens and the face side in tension in the other two specimens. No defects were observed in any of the specimens after the 180° bend tests which is a good indication of the excellent weld quality and ductility produced by the electrode of this invention.

*Example III*

Another butt weld in the flat position, identical in all respects to the one described in Example II, except that the diameter of the electrode used herein was as shown in Table V for a ⅛" core wire diameter, was also made to further illustrate the high quality of welds produced by the electrodes of this invention. The composition of the weld metal was as listed under "Example" in Table VI. The X-ray quality at a sensitivity of 2% was excellent since no porosity, no cracks and no other defects were observed. The tensile strength of the weld was 59,300 p.s.i. The 0.2% offset yield strength was 28,200 p.s.i., with 40% elongation in a one inch gage length across the weld. The two face-bend and two root-bend specimens were aboslutely free from defects such as weld cracking or fissuring after the 180° bend test.

*Example IV*

An X-weld crack test was made using an electrode having the composition and diameter as shown in Example II. The X-weld test specimen was made by depositing a weld between two 3" x 1" square bars of 70–30 copper-nickel alloy conforming to the composition of the plates in Example II. The two bars were butted together along the 3" length so that the adjoining surfaces of the two bars formed a double-V-groove type joint. Weld passes were deposited, two at a time, on alternate sides, and the specimen was allowed to cool below 200° F. between each set of passes. After welding, the specimen was sectioned in two places 1 inch apart in planes perpendicular to the direction of welding for macroexamination. The four cross-sectional faces, resulting from the two cuts, were polished on a fine-grained rubber-bonded abrasive wheel, etched to reveal weld grain structure and examined at a magnification of 30 diameters (30×) for evidence of cracks. No cracks or defects were observed in any of the four faces despite the severity of these tests.

To further evaluate the equality of the weld made under these highly restrained conditions, a ¼ inch thick cross-sectional slice was cut from the X-weld specimen and subjected to a side-bend test, such that the transverse cross-section of the X-weld was in tension. The specimen was bent in a free-bend a full 180° and then flattened without even producing a single crack or flaw.

*Example V*

A butt joint was prepared for welding in the overhead position to determine the soundness of a weld made in this position using an electrode having the composition set forth in Example II, and having a diameter as shown in Table V for a ⅛ inch core diameter. Two pieces of copper-nickel plate ⅜" thick, 5 inches wide and 10 inches long having a composition similar to the composition of the plates of Example II were bevelled along one 10" edge of each piece to form a 90° V when butted together. A ¹⁄₁₆" wide lip was left at the root edge of each plate. The two joint members were spaced ⅜ inch apart at the root and tack-welded at each end to a ¼" x 2" x 10" copper-nickel alloy backing strip of the 70–30 type. The whole joint assembly was then clamped up-side down to a 1½" thick steel plate which was 8" wide and 4' long suspended in a horizontal position from upright columns about seven feet from the floor. All welding and removal of slag were done with the weld joint assembly clamped to the steel plate in the overhead position. The total time required for welding the joint from the start of the first bead until the final pass was completed was surprisingly less than about 1½ hours. After welding, the ¼ inch backing strap was machined off and the weld X-rayed to 2% sensitivity. The X-ray showed the weld to be completely free of porosity, cracking and any defects whatsoever. These tests clearly indicate the versatility of the electrode of the present invention.

The present invention is particularly applicable to the welding and overlaying of copper-nickel alloys of the 70–30 type containing from about 25% to about 35% nickel, up to about 1% iron, up to about 3% manganese, up to about 1% titanium, up to about 1% silicon, less than about 0.2% carbon, up to about 1% zinc with the balance, apart from the usual impurities, essentially copper. However, the present invention is also applicable to the welding and overlaying of copper and copper alloys, including copper-nickel alloys of the 90–10 type, containing up to about 15% nickel, up to about 2% iron, up to about 1% manganese, up to about 1% zinc and up to about 2% silicon. The high level of weld quality made possible through the electrodes of this invention permits the use of arc-welding techniques in even the most critical applications, where assurance of top quality is of extreme importance. Furthermore, the excellent arc stability provided by the electrodes of this invention permits ease of control without the usual tendency of the electrode freezing to the work, or "shorting-out" when the arc length is shortened.

Although the present invention has been described in conjunction with preferred embodiments, it is to be understood that modification and variations may be resorted to without departing from the spirit and scope of the invention, as those skilled in the art will readily understand. Such modifications and variations are considered to be within the purview and scope of the invention and appended claims.

I claim:

1. A welding electrode having a core wire containing about 30% nickel, about 0.6 iron, about 0.1% silicon, about 0.8% manganese, about 0.25% titanium with the balance essentially copper and having a flux coating containing in parts by weight about 23 parts calcium carbonate, about 21 parts manganese carbonate, about 22 parts titanium dioxide, about 21 parts cryolite, about 1 part silicon, about 1 part titanium, about 3 parts bentonite and a silicate type binder.

2. A welding electrode having a core wire containing about 29% to about 32% nickel, about 0.3% to about 0.8% iron, less than about 0.1% carbon, up to about 0.5% silicon, up to about 1.5% manganese, up to about 0.5% titanium with the balance essentially copper and having a flux coating containing in parts by weight about 15 to about 30 parts calcium carbonate, about 15 to about 25 parts manganese carbonate, about 15 to about 30 parts titanium dioxide, about 10 to about 30 parts cryolite, about 0.5 to about 2 parts silicon, about 0.5 to about 2 parts titanium, about 2 to about 5 parts bentonite and a binder.

3. A welding electrode having a core wire containing about 29% to about 32% nickel, about 0.3% to about 0.8% iron, less than 0.1% carbon, up to about 0.5% silicon, up to about 1.5% manganese, up to about 0.5% titanium with the balance essentially copper and having a flux coating containing in parts by weight about 10 to about 40 parts alkaline earth metal carbonate selected from the group consisting of calcium carbonate, barium carbonate, strontium carbonate and combinations thereof, about 5 to about 30 parts manganese carbonate, about 10 to about 35 parts titanium dioxide and about 5 to about 40 parts cryolite.

4. A welding electrode having a core wire containing about 25% to about 35% nickel, up to about 1% iron, less than about 0.15% carbon, up to about 1% silicon, up to about 3% manganese, up to about 1% titanium with the balance being essentially copper and having a flux coating containing in parts by weight about 15 to about 30 parts calcium carbonate, about 15 to about 25 parts manganese carbonate, about 15 to about 30 parts titanium dioxide, about 10 to about 30 parts cryolite, about 0.5 to about 2 parts silicon, about 0.5 to about 2 parts titanium, about 2 to about 5 parts bentonite and a binder.

5. A welding electrode having a core wire containing about 25% to about 35% nickel, up to about 1% iron, less than about 0.15% carbon, up to about 1% silicon, up to about 3% manganese, up to about 1% titanium with the balance being esesntially copper and having a flux coating containing in parts by weight about 10 to about 40 parts alkaline earth metal carbonate selected from the group consisting of calcium carbonate, barium carbonate, strontium carbonate and combinations thereof, bout 5 to about 30 parts manganese carbonate, about 10 to about 35 parts titanium dioxide and about 5 to about 40 parts cryolite.

6. A welding electrode having a core wire containing about 25% to about 35% nickel, less than about 0.15% carbon, up to about 1% silicon, up to about 1% iron, up to about 3% manganese, up to about 1% titanium with the balance being essentially copper and having a flux containing in parts by weight about 5 to about 70 parts manganese carbonate, up to about 40 parts alkaline earth metal carbonate selected from the group consisting of calcium carbonate, barium carbonate, strontium carbonate and combinations thereof, the sum of the manganese carbonate and any alkaline earth metal carbonate in the flux being about 15 to about 70 parts, about 10 to about 35 parts titanium dioxide and about 5 to about 40 parts cryolite.

References Cited in the file of this patent

UNITED STATES PATENTS 2,520,806    Kihlgren et al. _____ Aug. 29, 1950